United States Patent
Wildhaber

[15] 3,700,911
[45] Oct. 24, 1972

[54] OPTICAL SCANNER WITH STRAIGHT SCANNING LINE

[72] Inventor: Ernest Wildhaber, 124 Summit Drive, Brighton, N.Y. 14620

[22] Filed: April 2, 1971

[21] Appl. No.: 130,735

[52] U.S. Cl. ..................250/236, 95/4.5, 250/227, 350/DIG. 1, 350/6, 350/96 B
[51] Int. Cl. ..................................H01j 3/14
[58] Field of Search..................350/6, 7, 273–275, 350/285, DIG. 1; 250/219, 235, 236, 227; 178/7.6; 356/23–26; 352/84, 114–118; 95/4.5

[56] References Cited

UNITED STATES PATENTS

| | | | |
|---|---|---|---|
| 3,602,572 | 8/1971 | Norris | 350/7 |
| 3,511,551 | 5/1970 | Matulka | 350/6 |
| 3,618,526 | 11/1971 | Baker | 350/96 B |
| 3,277,772 | 10/1966 | Atwood | 350/7 |
| 3,602,571 | 8/1971 | Norris | 350/7 |

*Primary Examiner*—David Schonberg
*Assistant Examiner*—Michael J. Tokar
*Attorney*—Shlesinger, Fitzsimmons & Shlesinger

[57] ABSTRACT

A rotor contains a plurality of lenses spaced about its axis at a constant distance therefrom. As it turns each lens successively forms an image of a narrow area moving along a straight scanning line. The image is formed adjacent a point eccentric of the rotor axis, the eccentricity being computed so that this point remains stationary as the rotor turns. A stationary plane mirror placed inside the lens circle displaces the image to a convenient location. Photocells are placed there. Preferably illumination of said narrow area of the record is through a lens of the rotor from a line-like area of light.

10 Claims, 12 Drawing Figures

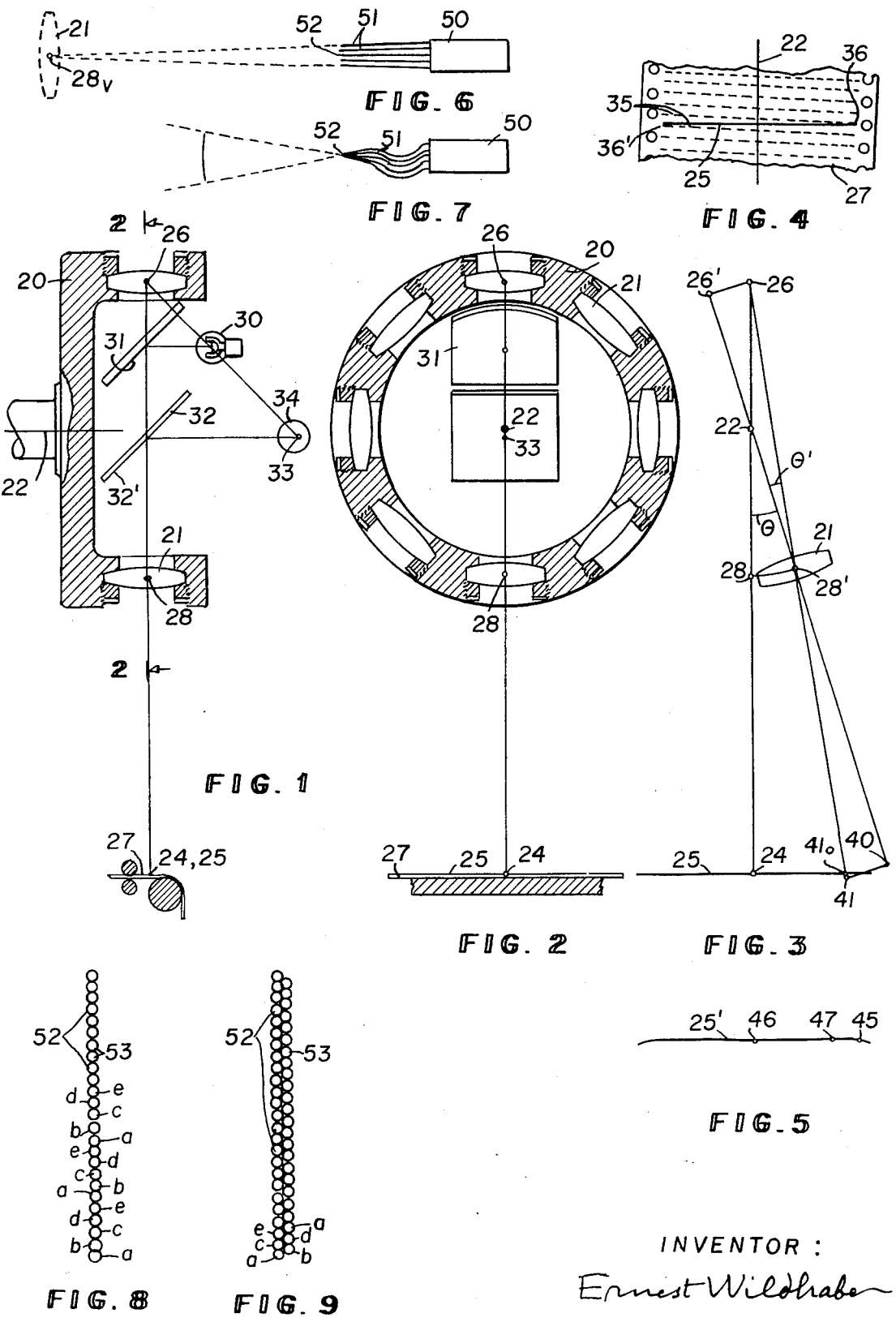

3,700,911

INVENTOR:
Ernest Wildhaber

OPTICAL SCANNER WITH STRAIGHT SCANNING LINE

The present invention relates to optical scanners capable of scanning along a line that is straight exactly or in close approximation. Straight-line scanning is advantageous in many applications and especially so when the record moves from a roll.

One object of the present invention is to provide a simple scanner capable of scanning along a straight line while projecting exact images. A further object is to provide such a scanner for many size ratios between the scanned portion and its image. A further aim is to adapt the optical scanning apparatus of my patent application Ser. No. 17,792, filed Mar. 9, 1970 to a straight scanning line. Other objects will appear in the course of the specification and in the recital of the appended claims.

Embodiments of the invention will be described with the drawings in which

FIG. 1 is an axial section taken through the scanning rotor, showing also associated parts and embodying the invention.

FIG. 2 is a cross-section taken along lines 2—2 of FIG. 1 and a view of associated parts.

FIG. 3 is an explanatory diagram, looking in the direction of the rotor axis.

FIG. 4 is a simplified view of a record and scanning line, viewed in direction 28–24 of FIG. 2.

FIG. 5 shows a slightly modified scanning line, viewed in the direction of the rotor axis.

FIGS. 6 and 7 show diagrammatically a laser combined with fiber optics in a view like FIG. 1 and at right angles thereto respectively, such as may be substituted for the incandescent lamp 30 shown in FIG. 1.

FIGS. 8 and 9 are enlarged views showing two ways of arranging the fibers to effect a line-like area of light, looking at the front end of the fibers.

Figure 10:
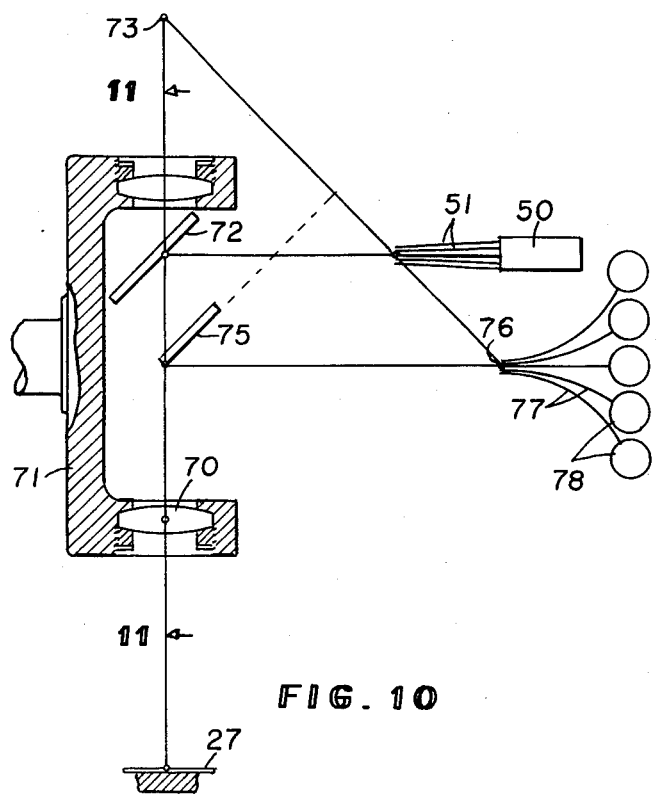
FIG. 10 is an axial section and a view similar to FIG. 1, showing a different proportion of the image size to the size of the corresponding portion on the record.

Rotor 20, FIGS. 1 and 2 contains a plurality of lenses 21 spaced about its axis 22 at a constant distance therefrom. The axis of each lens, such as line 22–24 in FIG. 2, includes a right angle with the direction of the rotor axis. The lenses may be secured in any suitable known way to the rotor. Also in place of the simple lenses indicated known lens combinations may be used. They may be aplanat lenses or lens combinations. These form a plane image of a plane object.

A stationary incandescent lamp 30 has a filament emitting light from a single straight line-like area. Its light is reflected by a plane stationary mirror 31 placed inside the circle described by the lenses, so that the virtual image of lamp 30, as formed by the mirror, is centered at stationary point 26. Lens 21 with center 28 forms an image of the narrow line-like area of light on record 27. The image, the lighted strip of the record, extends across the scanning line at approximately right angles thereto. The rays from mirror 31 pass through a beam splitter 32.

Lens 21 with center 28 would also form a real image of the narrow lighted strip of the record adjacent point 26 if it were not for the beam splitter 32 and mirror 31. The beam splitter directs part of the light to form an image of the lighted strip adjacent point 33. This point is the mirror image of point 26 as formed by the reflecting plane 32'.

As the rotor turns the lighted strip moves along the scanning line 25. The position of basic point 26 is computed so that the lighted strip remains in focus. Likewise the image of the lighted strip remains in focus. A photocell 34 is placed to receive the light at the region of point 33. It transforms the received fluctuations of light intensity into electric impulses, for transmission to a destination.

Displacement between the record and the rotor, if any, may be in any suitable known manner. In the embodiment illustrated in FIG. 1 the record is fed in time with the turning motion of the rotor with known sprocket wheels. The record moves approximately in the direction of the rotor axis, slightly tilted thereto. This is shown in FIG. 4. The record 27 is tilted just so much that adjacent character lines 35 of the record are close to the scanning line 25 at opposite ends 36, 36'. A new line is then started on right after the preceding line has been scanned. The tilt is between zero and five degrees.

Diagram FIG. 3 illustrates the computation. Lenses 21 are dimensioned to form an image of point 24 at 26 in the central position; and also an image of point 26 at 24. As the rotor turns through any angle $\theta$ lens center 28 moves to 28'. The image formed by the lens of point 26 is on line 26–28'. On aplanat lenses plane 26–26' parallel to the plane of the lens gives a plane image 40–41, where the sum of the reciprocals of the distances of said planes from lens center 28' equals the sum of the reciprocals of the distances 24–28 and 28–26. This is the known formula for simple lenses.

In mathematical terms, and with $r$ denoting the distance 22–28 of lens 21 from the rotor axis 22, $e$ the eccentricity 22–26 from the rotor axis, $a$ the distance 24–28 of the record from lens center 28, and $p$ the proportion $(r+e)/a$ of the image size at 26 to the size of the corresponding area portion of the record measured linearly, that is scale proportion, I have derived the formula $$e/r = p = (r+e)/a$$

It defines the required position of the basic point 26.
An outline of the derivation follows:

26', FIG. 3, is the normal projection of point 26 to the extended radius 22–28'. 40–41 is the image of line 26–26' as formed by aplanat lens 21. It is parallel to 26–26' and has a distance $a_x$ from point 28'. Angle $\theta' = $ 26–28'–26' is $$\tan \theta' = \frac{26-26'}{26'-28'} = \frac{e \sin \theta}{r + e \cos \theta}$$

and $$\frac{1}{a_x} + \frac{1}{r + e \cos \theta} = \frac{1}{a} + \frac{1}{r+e}$$

hence $$\frac{1}{a_x} = \frac{1}{a} - \frac{e(1-\cos \theta)}{(r+e)(r+e \cos \theta)}$$

Point 41 has been shown at a much exaggerated distance from the straight scanning line. Point 41 should be on the straight scanning line $25 = 24-41_o$ in excellent approximation. It would be on scanning line $24-41_o$ when $$(r+a_x) \cos \theta + a_x \tan \theta' \cdot \sin \theta = r + a$$

It can be demonstrated mathematically that this equation can be satisfied in close approximation at the angles $\theta$ used in the scanner when $$e/r = p = r + e/a$$

as pointed out.

At a diameter of $2r = 12''$ and a length to be scanned of $8''$ the maximum angle $\theta$ is $18.92°$ at $p = 1$. The out-of-focus distance $41-41_o$ then amounts to only $0.019''$ at the very end of the scanned line, $4''$ from center 24. At $3''$ from said center it is $0.0006''$. It is still less further towards the center.

If desired especially on rotors with fewer lenses the record and the scanning line may be bent slightly at the ends, as shown with exaggeration at scanning line 25' shown in FIG. 5. At a point 45 four inches from center 46 the departure from the straight line is only $0.019''$ in the above example. At point 47 3 inches from center 46 the departure is $0.0006''$. The ends are convex towards the rotor axis.

The above comparisons are based on the formulas for simple lenses. The results are somewhat modified when lens sets are used so that the lens apertures may be increased. The general trend however remains the same. Based on the above disclosure the modifications can be computed with the known procedures of the art.

Lenses that produce (at 40, FIG. 3) an image concavely curved towards the rotor axis 22 of a plane (26–26' are found to require slightly larger $e$-values than given by the above formula.

The described lens arrangement and formula is valid also for projection of points $41_o$ of the plane record to point 26. At $p = 1$ the point projected to 26 is out of exact focus the same amount as for projection the other way. In all cases it may be computed with known procedures.

With the present invention a practically exact projection is obtained from or to a straight scanning line. This is accomplished in a relatively simple manner.

FIG. 6 diagrammatically shows a stationary laser 50 that may be substituted for the incandescent lamp 30 shown in FIG. 1. It is preferably a non-pulsating gas laser. Lens 21 is shown in dotted lines in FIG. 6, as it would appear to the laser without the mirror 31. A large number of optical fibers 51 are used to form a line 52 made up of the fiber ends. The line-like narrow area of light is made up of a multiplicity of point-like elemental areas 53, as shown enlarged in FIG. 8 and in a modification in FIG. 9.

In the view of FIG. 6, that corresponds to the view of FIG. 1, the fibers 51 may appear pointed towards the lens center $28_b$, or parallel. In the view of FIG. 7 taken at right angles to FIG. 6 the light emission should have an angular spread large enough to cover the lens in all its active turning positions. If $41_o$ (FIG. 3) is the end of the scanning line, this spread should be double the angle $24-26-41_o$. To this end groups of fibers are provided whose individual fibers are directed at an angle to each other adjacent their ends, (FIG. 7).

For convenient illustration I have shown only five fibers in each group. The end fibers $a$, $e$ of each group are oppositely inclined to the central fiber $c$ at an angle $24-26-41_o$. The fibers $b$, $d$ are inclined half that much. The central fiber c has no inclination. The groups repeat until the entire length of the narrow strip of light is filled, as shown in FIGS. 8 and 9. To increase the spread of the individual fibers, I may also bend them in the view of FIG. 7. Finally the required angular spread is attained with sufficient uniformity.

Figure 11:
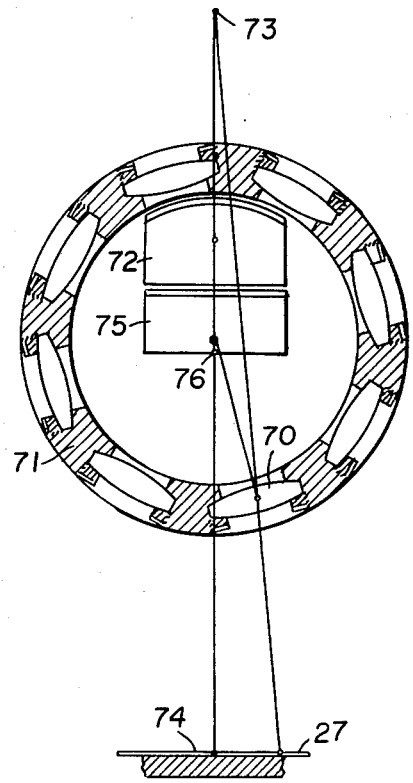
FIG. 11 is a cross-section of the rotor taken along lines 11—11 of FIG. 10, and an axial view corresponding to FIG. 10.

FIGS. 10 and 11 illustrate an embodiment where the strip of light produced by the light source is reduced in size by lens 70 of the rotor 71, so that the lighted strip appears smaller on the record, at half size in the example illustrated. The source of light is shown as a laser 50 with optical fibers 51, as described with FIGS. 6 to 9. Its light is reflected by plane stationary mirror 72 towards lens 70. The virtual image of the light strip is adjacent point 73. Part of the reflected light reaches said lens, which forms an image of the narrow strip of light on the record. This image, the lighted strip, moves along the straight scanning line 74 as the rotor turns, and thereby sweeps a line of characters of the record.

Some of the light of this lighted strip is reflected towards lens 70, which in the absence of obstacles would form an enlarged image of the lighted strip adjacent point 73. Part of this returning light is deflected by half-mirror 75. It displaces the image to a different position lengthwise of the rotor axis, to a point 76. Point 76 is the mirror image of point 73, as formed by half-mirror 75. Optical fibers 77 transmit the light of different points of the lighted strip to different photocells 78. In this way the lighted strip is subdivided into a large number of point-like elements, which are individually received and transmitted. This is useful when these elements have different light characteristics. It should be understood that this break-up into individual points could also be used in the first-described embodiment, if needed. A single photocell is preferably used when the record contains single rows of straight marks whose direction is matched by the lighted strip. Two photocells may be used when the symbols are made up of straight marks on two levels.

While half-mirror 75 has been shown in FIGS. 10 and 11, a beam splitter could substituted therefor. Likewise a half-mirror could be used for the beam splitter 32 shown in FIGS. 1 and 2.

It is also possible to light the record in any known way and project a narrow strip of the record at a time to a region that remains stationary as the rotor turns. The invention permits to achieve an accurate projection that is particularly useful when the strip is to be resolved into a multiplicity of individual points.

Figure 12:
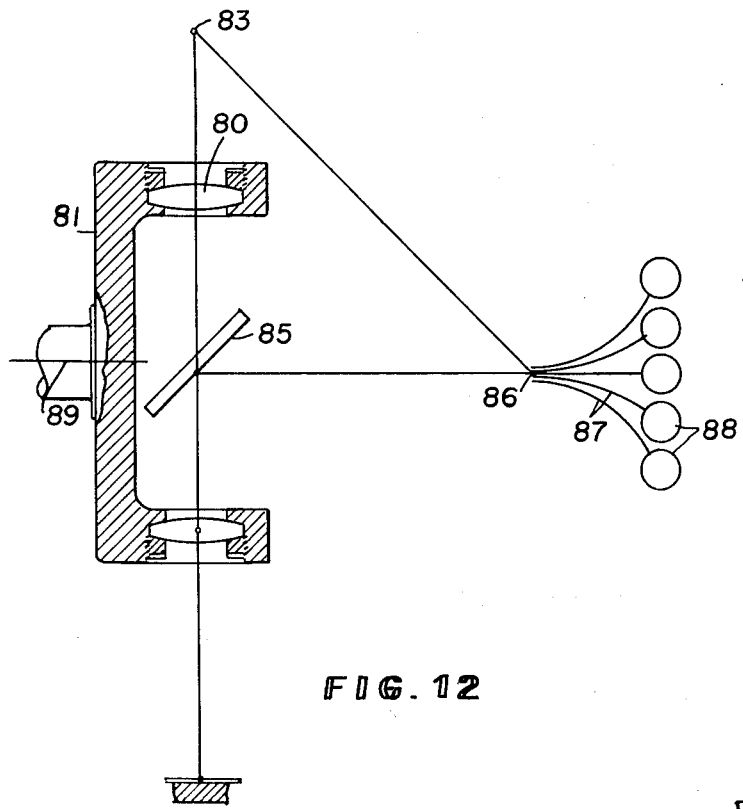
FIG. 12 is an axial section similar to FIG. 1 of a modification.

FIG. 12 illustrates this application. Lenses 80 and rotor 81 are identical with the lenses 70 and rotor 71 respectively. The lighting through lens 70 is here omitted and replaced by conventional lighting. Half-mirror 75 is replaced with a full mirror 85. In the absence of mirror 85, the image of the lighted strip on the record, as formed by lens 80, would be adjacent point 83, eccentric of the rotor axis 89 by more than half the distance $r$ of lens 80 from the rotor axis. It is double the distance $r$ in the illustrated case. Mirror 85 displaces this image lengthwise of the rotor axis, to a point 86. Optical fibers are placed adjacent point 86, to transmit the light received at the individual points to different photocells 88.

The invention is capable of further modifications, by applying the knowledge and current practice of the art to which the invention pertains, without departing from the spirit of the invention. For definition of its scope it is relied on the appended claims.

What I claim is:

1. Optical scanner operating with a scanning line that is straight at least approximately, comprising
    a rotor containing at least one lens at a distance from its axis,
    the axis of said lens including an angle with the direction of the rotor axis,
    means for supporting a record,
    means for effective relative displacement between said record and said rotor in a direction approximately parallel to the rotor axis,
    said record bearing characters arranged in a line and being supported to match said scanning line,
    means for illuminating said record,
    means for forming an image through said lens of a narrow line-like record area adjacent a point eccentric of and at a larger distance from said lens than the rotor axis whereby said line-like area sweeps said line of characters on rotation of the rotor,
    the eccentricity of said point being such that said image stays adjacent said point as the rotor turns and being larger than half the distance of said lens from the rotor axis in a direction away from said lens,
    a stationary mirror placed inside the circular path of said lens to displace said image to a different position lengthwise of the rotor axis,
    and means for converting the variations of light intensity at said displaced image into electric impulses.

2. Optical scanner according to claim 1, wherein said rotor contains a plurality of lenses spaced about its axis at a constant distance therefrom.

3. Optical scanner according to claim 1, wherein the eccentricity of said image from the rotor axis is larger than half the product of the lens distance therefrom multiplied by the scale ratio of the image to the corresponding record portion.

4. Optical scanner according to claim 1, wherein said eccentricity and the distance of said lens from the rotor axis are approximately at the scale ratio of said image to the corresponding portion of the record.

5. Optical scanner according to claim 1, wherein a support is provided for the record, said support is straight in the direction of the scanning line for most of its length and minutely curved adjacent the ends of the scanning line, being convex towards the rotor axis.

6. Optical scanner operating with a scanning line that is straight at least approximately, comprising
    a rotor containing at least one lens at a distance from its axis,
    the axis of said lens including an angle with the rotor axis,
    means for receiving a record bearing characters arranged in a line,
    means for emitting light from a narrow line-like area and for directing said light so that it appears to come from a region eccentric of the rotor axis and at a larger distance from said lens than the rotor axis, and to pass through said lens onto the record,
    said region being a distance from the rotor axis more than half the distance of said lens therefrom,
    said light-emitting means illuminating a straight line-like strip of said record, so that said lighted strip moves along said line of characters upon rotation of said rotor,
    means for forming an image of said moving strip adjacent a point that remains stationary as the rotor turns,
    and means for converting the fluctuations of light intensity received at said image into electric impulses.

7. Optical scanner according to claim 6, wherein said rotor contains a plurality of lenses spaced about its axis at a constant distance therefrom and the axes of said lenses are at approximately right angles to the rotor axis.

8. Optical scanner according to claim 6, wherein the means for emitting light is an incandescent lamp having a filament that extends along a single straight line.

9. Optical scanner according to claim 6, wherein the means for emitting light from a narrow line-like area is a stationary laser combined with stationary optical fibers leading from the laser outlet to said area.

10. Optical scanner according to claim 6, wherein optical fiber means are provided to split up the image of the lighted strip into a plurality of point-like elements, whose varying light intensity is transmitted to separate photocells.

* * * * *